UNITED STATES PATENT OFFICE.

JULIUS J. SUCKERT, OF NEW YORK, N. Y., ASSIGNOR TO GELIEN & CO., OF SAME PLACE.

IMPROVEMENT IN COMPOSITIONS FOR PREVENTING ACID FERMENTATION.

Specification forming part of Letters Patent No. 176,898, dated May 2, 1876; application filed March 13, 1876.

*To all whom it may concern:*

Be it known that I, JULIUS J. SUCKERT, of New York, in the county of New York and State of New York, have invented certain Improvements in Chemical Compounds for Preventing Acid Fermentation, of which the following is a specification:

My invention consists of a compound for preventing acetic fermentation in beer and similar liquids.

As is well known, after beer and similar fermented liquids have been made and allowed to stand for a length of time on draft, and especially if the air be admitted to them, they become sour and unfit for use, and thus much of them is wasted, especially in warm weather. The object of my invention is to prevent this, which I do by means of a compound prepared as follows:

I take of the saturated solution of—

| | |
|---|---|
| Sulphurous acid, by weight | 94 parts. |
| Freshly-precipitated carbonate of lime | 4 " |
| Pure salicylic acid | 1 " |
| Chemically pure carbonate of soda | $\frac{1}{2}$ " |
| Freshly-precipitated oxide of aluminium | $\frac{1}{2}$ " |
| Total | 100 " |

To prepare this mixture or compound, the lime and salicylic acid are first dissolved in the sulphurous acid, and then the other ingredients are added. The mixture is then allowed to stand for a few hours, after which it is filtered from the deposit that is formed, when the solution thus obtained is ready for use.

Care must be taken, in dissolving the ingredients, that the temperature of the solution be not raised above 50° Fahrenheit; and to attain this result it is best to perform the operation in a vessel well cooled by ice or other frigorific means.

The compound may be made to act nearly as well by omitting the two last ingredients; but I prefer to use them. The oxide of aluminium acts to produce a precipitation of all solid or undissolved particles which may remain in the solution, thus rendering it more easy to separate the sediment.

*Directions for use.*—The compound or solution is added to the beer or other liquid in the proportion of about one-twelve-hundredth part, it being first mixed with half its quantity of cold water.

As a preventive of the irregular or acid fermentation of both upper and lower beer, it should be added while extracting the malt. For beer that is on the point of souring, or that has already turned sour, one part of the solution added to twelve hundred parts of the beer will at once arrest the acid fermentation and prevent any further deterioration.

The one-thousandth part may be added without injury, and in some cases it may be necessary or advisable to use that proportion.

This compound is also valuable for cleansing barrels, kegs, and all other vessels used for beer and similar liquids. For such purpose the vessel should first be well rinsed with water, and then the solution used in the proportion of one-fourth of a pint for a four-gallon keg, and in that proportion for larger vessels, it being poured into the vessel and thoroughly shaken about, so as to bring it into contact with the entire inner surface. After allowing the vessel to drip for a few moments it is ready for use. By this process all mold or fungoid particles are entirely destroyed, and the vessel rendered perfectly sweet and clean.

This compound, while arresting acetic fermentation, does not at all interfere with the alcoholic fermentation of the beer or other liquid to which it may be added.

Having thus described my invention, what I claim is—

The herein-described compound, consisting of sulphurous acid, carbonate of lime, and salicylic acid, with or without the addition of the carbonate of soda and the oxide of aluminium, in the proportions substantially as specified.

JULIUS J. SUCKERT.

Witnesses:
CHARLES F. LEAVITT,
A. ELDRIDGE BROWN.